(12) United States Patent
Lafon et al.

(10) Patent No.: US 10,794,724 B2
(45) Date of Patent: Oct. 6, 2020

(54) ELECTRONIC INTERFACE DEVICE BETWEEN AT LEAST ONE AVIONIC SYSTEM AND A SET OF SENSORS, RELATED AVIONIC INSTALLATION, COMMUNICATION METHOD AND COMPUTER PROGRAM

(71) Applicant: THALES, Courbevoie (FR)

(72) Inventors: Stéphanie Lafon, Merignac (FR);
Thomas Ripoche, Merignac (FR);
Benoit Baillarin, Toulouse (FR)

(73) Assignee: THALES, Courbevoie (FR)

( * ) Notice: Subject to any disclaimer, the term of this patent is extended or adjusted under 35 U.S.C. 154(b) by 0 days.

(21) Appl. No.: 16/230,848

(22) Filed: Dec. 21, 2018

(65) Prior Publication Data

US 2019/0195652 A1    Jun. 27, 2019

(30) Foreign Application Priority Data

Dec. 26, 2017    (FR) ...................................... 17 01362

(51) Int. Cl.
*G06F 3/01*    (2006.01)
*G01C 23/00*    (2006.01)
(Continued)

(52) U.S. Cl.
CPC .............. *G01C 23/00* (2013.01); *B64D 43/00* (2013.01); *G08G 5/0021* (2013.01); *G06F 2203/0381* (2013.01)

(58) Field of Classification Search
CPC ...... G01C 23/00; G08G 5/0021; B64D 43/00; G06F 2203/0381; G06F 3/01; G06F 3/013; G06F 3/017; G06F 3/041; G06F 3/162

See application file for complete search history.

(56) References Cited

U.S. PATENT DOCUMENTS 9,377,852 B1 * 6/2016 Shapiro .................... G06F 3/013
2006/0276942 A1 * 12/2006 Anderson ............ G07C 5/0858
701/33.4

(Continued)

FOREIGN PATENT DOCUMENTS

EP    2254105 A2    11/2010
EP    2916309 A1    9/2015

OTHER PUBLICATIONS

Search Report issued in French Application No. 1701362 dated Sep. 19, 2018.

*Primary Examiner* — Masud Ahmed
(74) *Attorney, Agent, or Firm* — Arent Fox, LLP

(57) ABSTRACT

This electronic interface device between at least one avionic system and a set of sensors, each avionic system and the sensors being capable of being connected to an electronic interface device, is intended to be on board an aircraft. It comprises a module for detecting a first signal sent by a user or a piece of electronic equipment and received by a first sensor of the set; a module for activating at least a first sensor of the set, for receiving a second signal from the user or the piece of electronic equipment, each second sensor being determined based on the first signal and predefined determining rules; a module for acquiring the second signal received by each second sensor; and a module for generating a message corresponding to the second signal and sending said message to one or several avionic systems.

12 Claims, 2 Drawing Sheets

(51) Int. Cl.
*B64D 43/00* (2006.01)
*G08G 5/00* (2006.01)

(56) References Cited

U.S. PATENT DOCUMENTS

| | | | |
|---|---|---|---|
| 2006/0276943 A1* | 12/2006 | Anderson | G07C 5/008 |
| | | | 701/33.4 |
| 2007/0288242 A1* | 12/2007 | Spengler | G10L 15/20 |
| | | | 704/275 |
| 2010/0030400 A1* | 2/2010 | Komer | G10L 15/26 |
| | | | 701/3 |
| 2010/0295706 A1* | 11/2010 | Mathan | G01C 23/005 |
| | | | 340/951 |
| 2012/0078448 A1* | 3/2012 | Dorneich | G08B 21/06 |
| | | | 701/3 |
| 2015/0251771 A1* | 9/2015 | Whitlow | B64D 45/00 |
| | | | 701/3 |
| 2016/0009411 A1* | 1/2016 | Davalos | B64D 47/02 |
| | | | 345/156 |
| 2016/0012292 A1* | 1/2016 | Perna | G06F 16/5838 |
| | | | 382/117 |

* cited by examiner

ELECTRONIC INTERFACE DEVICE BETWEEN AT LEAST ONE AVIONIC SYSTEM AND A SET OF SENSORS, RELATED AVIONIC INSTALLATION, COMMUNICATION METHOD AND COMPUTER PROGRAM

CROSS-REFERENCE TO RELATED APPLICATIONS

This application is a U.S. non-provisional application claiming the benefit of French Application No. 17 01362, filed on Dec. 26, 2017, which is incorporated herein by reference in its entirety.

FIELD

The present invention relates to an electronic interface device between at least one avionic system and a set of sensors, each avionic system and the sensors being capable of being connected to an electronic interface device, the electronic interface device being intended to be on board an aircraft.

The invention also relates to an avionic installation intended to be on board an aircraft, the avionic installation comprising at least one avionic system, a set of sensors and such an electronic interface device connected between each avionic system and the set of sensors.

The invention also relates to a communication method between at least one avionic system and a set of sensors, the method being carried out by such an electronic interface device able to be connected to each avionic system and the sensors and to be on board an aircraft.

The invention also relates to a non-transitory computer-readable medium including a computer program including software instructions which, when executed by a computer, implement such a communication method.

The invention then relates to the field of man-machine interfaces (MMI) for controlling at least one avionic system of an aircraft, preferably intended to be installed in an aircraft cockpit.

BACKGROUND

Aircraft cockpits are typically equipped with various interactive means that allow a user to interact with the aircraft, in order to carry out a command, such as a piloting command or a change to the display on a display screen. All of these interactive means then form a device for detecting signals from the user, also called man-system interface (MSI).

As an example, airplane cockpits include interactive means, generally mechanical, such as rotary controls, contactors, pushbuttons or switches.

Additionally, touch-sensitive interactive means make it possible to perform a command by simply touching a touch-sensitive surface. It is in particular known to incorporate such touch-sensitive surfaces into a display.

However, with such man-system interfaces, the interaction modes between a user, such as a pilot of the aircraft, or a piece of electronic equipment within an aircraft cockpit, and the man-system interface are limited.

SUMMARY

The aim of the invention is then to propose an electronic interface device between at least one avionic system and a set of sensors, which offers a better interaction with the user or the electronic equipment, making it possible to take into account different signals from the user or the electronic equipment and while offering more possible interaction modes.

To that end, the invention relates to an electronic interface device between at least one avionic system and a set of sensors, each avionic system and the sensors being capable of being connected to an electronic interface device, the electronic interface device comprising:
  a detection module configured to detect a first signal, the first signal being able to be sent by a user or a piece of electronic equipment and received by a first sensor from the set of sensors;
  an activation module configured to activate at least one second sensor from the set of sensors, to receive a second signal from the user or the piece of electronic equipment, each second sensor being determined based on the first detected signal and predefined determination rules;
  an acquisition module configured to acquire the second signal, received by each second sensor; and
  a generating module configured to generate a message corresponding to the second acquired signal and to send said message to one or several corresponding avionic systems.

Thus, the electronic interface device according to the invention makes it possible to interact with several sensors from the set of sensors, by detecting, on the one hand, a first signal received by a first sensor from the set, then activating, on the other hand, at least one second sensor from the set in order to receive a second signal, and lastly generating a message from the acquired second signal to send it to the corresponding avionic system(s).

The electronic interface device according to the invention is then also called interpreter, in that it makes it possible to manage several modalities and to interpret, with respect to the corresponding avionic system(s), the signals associated with said different modalities.

A platform including the set of sensors and the electronic interface device is then also called multimodal platform.

Modality refers to the association of a sensor and a language making it possible to retranscribe, in useful information, a signal detected by the sensor. A modality is then defined by the pair formed by the sensor and the language.

The first signal detected by the detection module is also called triggering event, since it constitutes the event triggering a sequence of successive interactions between the user, or the equipment, and the multimodal platform.

The set of predefined determining rules making it possible to determine the second sensor(s) to be activated based on the first detected signal for example includes a modality tree indicating the modality or modalities that may take place in the interaction with the user or the equipment, based on the triggering event at the source of said new interaction.

The set of predefined determining rules for example further includes configuration data of the cockpit of the aircraft, in addition to the modality tree, with a view to this determination of the second sensor(s) to be activated based on the first detected signal and/or with a view to the subsequent processing of the second signal acquired during the generation of the message.

The set of predefined determining rules is for example stored in a database, intended to be connected to the electronic interface device. This database is able to be synchronized with the cockpit of the aircraft, upon launching the latter, to correspond to a current configuration of the cockpit.

According to other advantageous aspects of the invention, the electronic interface device comprises one or more of the following features, considered alone or according to all technically possible combinations:

the electronic interface device further comprises:
  a second activation module configured to activate at least one device for processing the second acquired signal, the processing device being outside the interface device;
  a second acquisition module configured to acquire the second processed signal, by the processing device,
  the generating module then being configured to generate a message corresponding to the second processed signal;
the electronic interface device further comprises a recording module configured to record at least one second acquired signal,
the recording module preferably being configured to record at least one current second acquired signal in case of absence of acquisition, by the second acquisition module, of a preceding second signal processed after the activation, by the second activation module, of a processing device for processing a preceding acquired second signal;
the generating module is further configured to verify the coherence of each acquired second signal based on predefined verification rules, and in case of incoherence, to ignore said acquired second signal;
the generating module is further configured to apply processing to the second signal based on configuration data of the cockpit of the aircraft, and to generate a message corresponding to the processed second signal;
when several second sensors are activated by the activation module, the generating module is further configured to select a second signal from among the second signals acquired based on predefined selection rules, and to generate the message corresponding to the selected second signal;
each second sensor activated by the activation module is of a different type from that of the first sensor,
each sensor from the set of sensors preferably being of the type chosen from among the group consisting of: a touch-sensitive sensor, a mechanical sensor, a sound sensor, an image sensor, a movement sensor, an eye tracking sensor, a physiological sensor and a data receiver;
each signal from the user is a signal chosen from among the group consisting of: a gesture signal, a touch on a touch-sensitive screen, an action on a mechanical element, a voice signal, a visual signal and a physiological signal; and
the signal of the electronic equipment is a data signal, said data signal preferably being an electric, radioelectric or light signal.

The invention also relates to an avionic installation intended to be on board an aircraft, the avionic installation comprising at least one avionic system, a set of sensors and an electronic interface device connected between each avionic system and the set of sensors, wherein the electronic interface device is as defined above.

According to another advantageous aspect of the invention, the avionic installation comprises the following feature:

the avionic installation further comprises at least one secure gateway, and the electronic interface device is connected to each avionic system via a corresponding secure gateway.

The invention also relates to a communication method between at least one avionic system and a set of sensors, the method being carried out by an electronic interface device able to be connected to each avionic system and the sensors, the method comprising:
  detecting a first signal, the first signal being able to be sent by a user or a piece of electronic equipment and received by a first sensor from the set of sensors;
  activating at least one second sensor from the set of sensors, to receive a second signal from the user or the piece of electronic equipment, each second sensor being determined based on the first detected signal and predefined determination rules;
  acquiring the second signal, received by each second sensor; and
  generating a message corresponding to the second acquired signal, and sending said message to one or several corresponding avionic systems.

The invention also relates to a non-transitory computer-readable medium including a computer program including software instructions which, when executed by a computer, implement a communication method as defined above.

BRIEF DESCRIPTION OF THE DRAWINGS

These features and advantages of the invention will appear more clearly upon reading the following description, provided solely as a non-limiting example, and done in reference to the appended drawings, in which.

DETAILED DESCRIPTION

Figure 1:
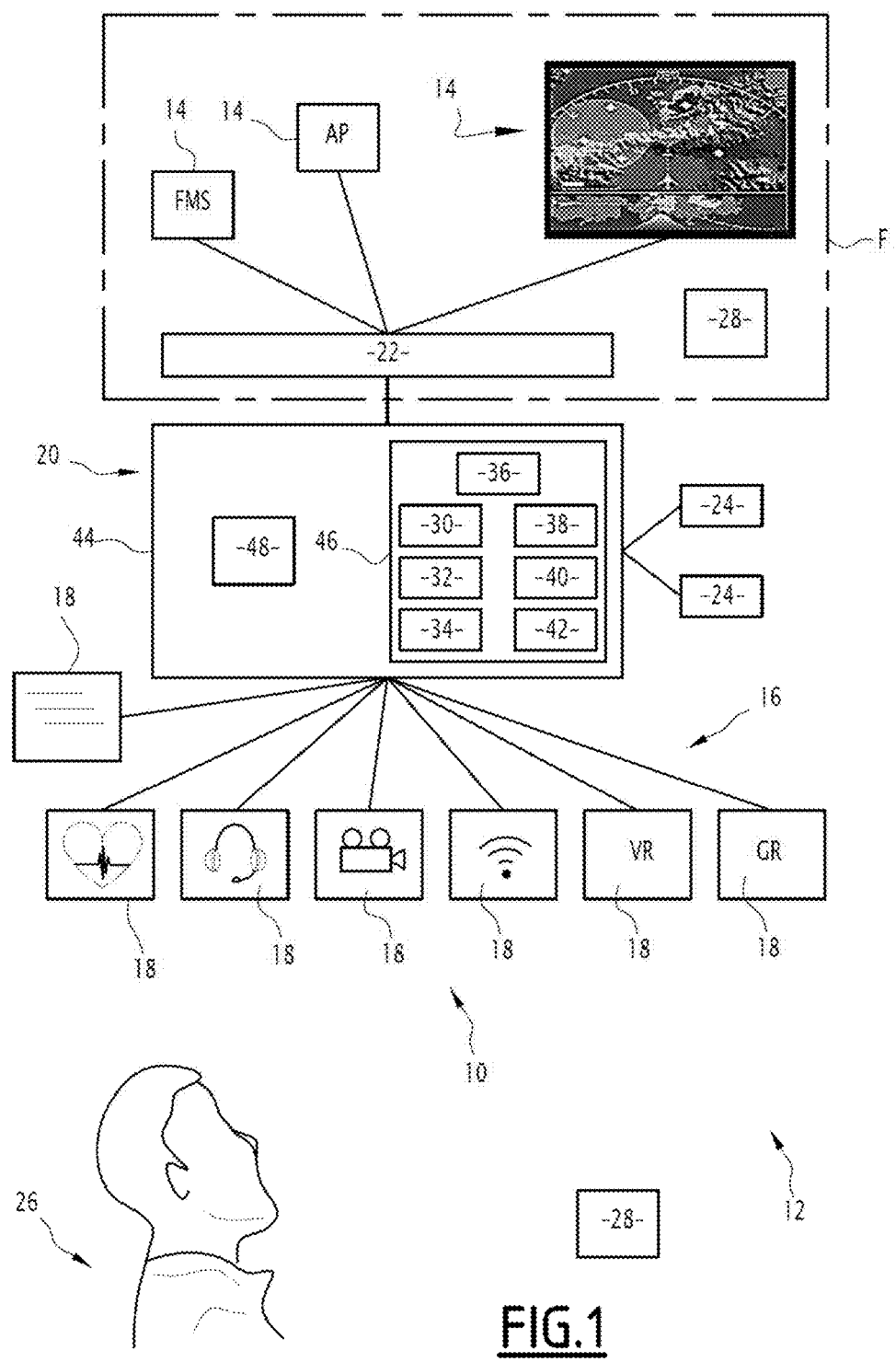
FIG. 1 is a schematic illustration of an avionic installation according to the invention, intended to be on board an aircraft and comprising several avionic systems, a set of sensors and an electronic interface device connected between each avionic system and the set of sensors.

In FIG. 1, an avionic installation 10, intended to be on board an aircraft 12, comprises at least one avionic system 14, a set 16 of sensors 18 and an electronic interface device 20 connected between each avionic system 14 and the set 16 of sensors.

The avionic installation 10 preferably comprises several avionic systems 14, for example three avionic systems 14 as shown in FIG. 1.

As an optional addition, the avionic installation 10 further comprises at least one secure gateway 22, interconnected between each avionic system 14 and the electronic interface device 20. The secure gateway 22 is a computer gateway forming, in particular for the electronic interface device 20, a secure access point to a closed, or secure, world to which the avionic systems 14 belong, the closed world being delimited by the border F in FIG. 1. The secure gateway 22 is then at the interface between an open world to which the electronic interface device 20 belongs and at least some sensors 18 of the set 16 and said closed world. According to this optional addition, the electronic interface device 20 is connected to each avionic system 14 via the corresponding secure gateway 22.

As an optional addition, the avionic installation 10 also comprises at least one processing device 24 configured to process a signal, each processing device 24 being outside the interface device 20. In the example of FIG. 1, the avionic installation 10 comprises two processing devices 24, for example a voice recognition device on the one hand and a gesture recognition device on the other hand.

The aircraft 12 is preferably an airplane. Alternatively, the aircraft 12 is a helicopter, or a drone piloted remotely by a pilot.

Each avionic system 14 is an electronic system intended to be on board the aircraft 12 and to carry out an avionic function. The avionic system 14 is for example a flight management system (FMS), or an automatic pilot (AP), or a viewing system.

The set 16 includes multiple sensors 18.

A sensor generally refers to an electronic element able to detect information or a signal, then optionally to process the detected information or signal. The signal detected by each sensor 18 is a signal sent by a user 26 or a piece of electronic equipment 28. One skilled in the art will understand that the piece of electronic equipment 28 coming from the signal that may be detected by a sensor 18 is a piece of electronic equipment from the closed world or a piece of electronic equipment from the open world, said piece of electronic equipment 28 not necessarily being on board the aircraft 12.

Each signal from the user 26 is then in particular a signal chosen from among the group consisting of: a gesture signal, a touch on a touch-sensitive surface, an action on a mechanical element, a voice signal, a visual signal and a physiological signal.

The signal of the piece of electronic equipment 28 is a data signal, said data signal preferably being an electric, radioelectric or light signal.

Different types of sensors 18 of the set 16 are illustrated as an example in FIG. 1. The sensor 18 is for example a touch-sensitive sensor, shown by a symbol with three parallel lines, configured to detect one or several tactile taps and the positions associated with said taps, said tactile taps typically being done by contact by the users finger(s) with the tactile sensor. The touch-sensitive sensor is generally in the form of a touch-sensitive surface integrated into a display screen, or a trackpad.

One skilled in the art will see that the piece of electronic equipment 28 is also able to include a touch-sensitive sensor, and if applicable, a touch-sensitive tap from the user 26 is then also capable of being detected indirectly via the piece of electronic equipment 28.

The sensor 18 is for example a physiological sensor, symbolized by a heart, configured to detect a physiological signal from the user 28. The physiological signal is for example a pulse, a heart rhythm or heartbeats, a sweat level, or brain activity of the user 26. The physiological sensor is for example a heart sensor or an accelerometer arranged in contact with the user 26.

The sensor 18 is for example a sound sensor, symbolized by a microphone, configured to detect an audio signal. The audio signal is for example a voice signal, i.e., a sound signal emitted by the user 26, in particular by his vocal cords. The sound sensor is for example an acoustic microphone, or an osteophonic microphone placed in contact with the face of the user 26.

The sensor 18 is for example an image sensor, symbolized by a camera, configured to detect an image of a scene toward which said sensor is pointed. The image sensor is for example an image sensor in the visible domain, or an infrared image sensor. The sensor 18 is for example a data receiver, shown by a Wi-Fi symbol, configured to receive a signal from the electronic equipment 28. The data receiver is for example a radioelectric receiver configured to receive the signal from the piece of electronic equipment 28 in the form of radio waves, or a wired receiver configured to receive the signal from said electronic equipment 28 via a wired datalink.

The sensor 18 is for example also a voice recognition engine, represented by the symbol VR (for Voice Recognition), configured on the one hand to detect a voice signal, then on the other hand to transcribe the detected voice signal in a set of words. In other words, the voice recognition engine is a voice recognition device combined with a microphone.

The sensor 18 is for example a gesture recognition engine, represented by the symbol GR (for Gesture Recognition), configured on the one hand to detect a gesture signal by the user 26, then on the other hand to identify the detected gesture.

The sensor 18 is also for example a mechanical sensor, not shown, such as a physical button, for example a pushbutton, able to be activated by the user 26, or a physical rotary control, configured to detect a rotational action performed by the user 26 on said rotary control.

The sensor 18 is for example a movement sensor configured to detect a movement by the user 26, such as a gesture signal performed by the user 26, i.e., a movement by one of the user's limbs or his head.

The sensor 18 is for example an eye tracking sensor configured to detect a visual signal from the user 26, i.e., a signal generated by one or both eyes of the user 26, for example a movement of the gaze of the user 26 or a blink by one or both eyes of the user 26, or a variation in the size of the pupil of the user 26 relative to a predefined pupil size.

Other types of sensors 18 are also possible, such as a brightness sensor configured to detect a brightness level, or a pressure sensor configured to detect a pressure level.

The electronic interface device 20 is configured to interconnect each avionic system 14 and the sensor(s) 18 of the set 16, each avionic system 14 and the sensors 18 being able to be connected to the electronic interface device 20. It is also called interpreter, in that it makes it possible to interpret signals acquired from the sensor(s) 18, to retranscribe useful information therefrom intended for the avionic system(s) 14.

The electronic interface device 20 is intended to be on board the aircraft 12 and comprises a detection module 30 configured to detect a first signal, the first signal being able to be sent by a user 26 or the electronic equipment 28, and received by a first sensor 18 from the set 16 of sensors.

The electronic interface device 20 also comprises an activation module 32 configured to activate at least one second sensor 18 of the set 16 of sensors, for the purposes of receiving a second signal sent by the user 26 or the piece of electronic equipment 28. Each second sensor 18 is then determined based on the detected first signal and predefined determining rules.

The electronic interface device 20 also comprises an acquisition module 34 configured to acquire the second signal, received by each second sensor, and a generating module 36 configured to generate a message corresponding to the second acquired signal and to send said message to one or several corresponding avionic systems 14.

One skilled in the art will note that the activation module 32 is, for certain triggering event(s), i.e., first detected signal(s), configured to activate several second sensors 18 of the set 16 of sensors, intended each to receive a second signal sent by the user 26 or the electronic equipment 28. The acquisition module 34 is then configured to acquire all of the second signals, received from the plurality of activated second sensors 18. The generating module 36 will then be configured if needed to select only some of the acquired second signals, such as a single second signal in particular, from among the set of acquired second signals, for example by analyzing the coherence of the acquired second signals to select the most likely one or ones.

As an optional addition, the electronic interface device 20 further comprises a second activation module 38 configured to activate at least one processing device 24 in order to process the second acquired signal, and a second acquisition module 40 configured to acquire the second processed signal from the processing device 24, the generating module 36 then being configured to generate a message corresponding to the second processed signal.

Also as an optional addition, the electronic interface device 20 further comprises a recording module 42 configured to record at least one acquired second signal, the recording module 42 preferably being configured to record a current acquired second signal in case of activation of a processing device 24 by the second activation module 38 for a preceding acquired second signal, then absence of reception of the corresponding processed preceding second signal, i.e., in case of absence of acquisition, by the second acquisition module 40, of the processed preceding second signal. In other words, the recording module 42 is configured to record a second acquired signal if the corresponding processing device 24 is unavailable to process the second signal after it is acquired by the acquisition module 34.

According to this optional addition, when the processing device 24 is again available to process a second signal, the recording module 42 is then configured to successively send each recorded second signal to said processing device 24. This then makes it possible to perform deferred processing of the second recorded signal(s), in case of preceding temporary unavailability of the corresponding processing device 24.

In the example of FIG. 1, the electronic interface device 20 comprises an information processing unit 44, for example made up of a memory 46 and a processor 48 associated with the memory 46.

In the example of FIG. 1, the detection module 30, the activation module 32, the acquisition module 34 and the generating module 36, as well as, optionally and additionally, the second activation module 38, the second acquisition module 40 and the recording module 42, are each made in the form of software, or a software unit, executable by the processor 48. The memory 46 of the electronic interface device 20 is then able to store a detection software configured to detect the first signal received by the first sensor 18, an activation software configured to activate at least one second sensor 18, based on the first detected signal and predefined determining rules, an acquisition software configured to acquire the second signal, received by each second sensor 18, and a generating software configured to generate the message corresponding to the second acquired signal and to send it to one or several corresponding avionic systems 14. As an optional addition, the memory 46 is further able to store a second activation software configured to activate at least one processing device 24 to process the second acquired signal, and a second acquisition software configured to acquire the second processed signal from the processing device 24, the generating software then being configured to generate the message corresponding to the second processed signal. Also as an optional addition, the memory 46 is able to store a recording software configured to record at least one acquired second signal, in particular to record a current acquired second signal in case of activation of a processing device 24 for a preceding acquired second signal and when there is no return from said processing device 24, i.e., when there is no acquisition by the second acquisition software of the processed preceding second signal. The processor 48 is then able to execute each of the software applications from among the detection software, the activation software, the acquisition software and the generating software, as well as, as an optional addition, the second activation software, the second acquisition software and the recording software.

In an alternative that is not shown, the detection module 30, the activation module 32, the acquisition module 34 and the generating module 36, as well as, as an optional addition, the second activation module 38, the second acquisition module 40 and the recording module 42, are each made in the form of a programmable logic component, such as an FPGA (Field Programmable Gate Array), or in the form of a dedicated integrated circuit, such as an ASIC (Application-Specific Integrated Circuit).

When the electronic interface device 20 is made in the form of one or several software programs, i.e., in the form of a computer program, it is further able to be stored on a medium, not shown, readable by computer. The computer-readable medium is for example a medium suitable for storing electronic instructions and able to be coupled with a bus of a computer system. As an example, the readable medium is a floppy disk, an optical disc, a CD-ROM, a magnetic-optical disc, a ROM memory, a RAM memory, any type of non-volatile memory (for example, EPROM, EEPROM, FLASH, NVRAM), a magnetic card or an optical card. A computer program including software instructions is then stored on the readable medium.

The detection module 30 is connected to the set of sensors 16 and is able to detect a first signal received by a first sensor 18 from the set 16.

The first signal is for example pressure on a touch-sensitive surface associated with a man/machine interface, such as pressure on a zone using voice recognition. The first signal is for example pressure on a physical button, such as a button associated with a predefined command, for example a voice command.

As an additional example, the first signal is the observation by the user 26 of a specific zone, the first signal then being detected when the user 26 is looking at this specific zone.

The first signal is also for example a voice signal, such as a keyword stated orally by the user 26.

As another additional example, the first signal is a gesture-based signal, such as the entry of the hand of the user 26 in a given geographical zone, or a particular gesture by the user, such as a gesture with one or several of his limbs, for example his forearm.

The first signal is for example a particular state of the user 26, detected by a physiological sensor, such as a stress state above a predefined threshold.

Alternatively, the first signal detected by the detection module 30 is a signal sent by the piece of electronic equipment 28, this signal for example being a particular element of a mission of the aircraft 12, such as the entry into a specific flight phase of the aircraft 12, the reception of an alert or of a message.

When the first signal is a signal sent by the piece of electronic equipment 28, this first signal is for example an event of the avionic system, such as a call for an avionics function, a failure in the aircraft 12 or the illumination of an indicator in the cockpit of the aircraft 12.

As another additional example, the first signal sent by the piece of electronic equipment 28 is an event coming from the open world, such as the receipt of a call from the piece of electronic equipment 28 then located in the open world, either inside the aircraft 12 or on the ground.

The detection module 30 is preferably configured to listen continuously to, i.e., to monitor continuously, the signals received by the various sensors 18 from the set 16, in order to detect this first signal, forming a triggering event.

One skilled in the art will understand that the detection, by the detection module 30, of this first signal as triggering event is for example done by comparison with a predefined list of triggering events.

The activation module 32 is then configured to activate at least one second sensor 18 of the set 16 as a function of the first detected signal and predefined determining rules, the or each second sensor 18 thus activated then being able to detect a second signal from the user 26 or the piece of electronic equipment 28.

Each second sensor 18 activated by the activation module 32 is preferably of a different type from that of the first sensor 18 having received the first signal detected by the detection module 30.

The set of predefined determining rules making it possible to determine the second sensor(s) 18 to be activated, based on the first signal detected by the detection module 30, is for example defined from a modality tree indicating the modality or modalities, in particular the second sensor(s) 18, that may participate in the interaction with the user 26 or the equipment 28, based on the detected first signal at the source of said new interaction between the user 26 or the piece of electronic equipment 28 and the electronic interface device 20 The modality tree is for example a predefined tree, describing, at the given moment in time, all of the possible interactions in the cockpit of the aircraft 12. As an example, this modality tree is defined by specifying the interactions taken into account by the electronic interface device 20, for example by carrying out the following sub-steps for each interaction: defining the event triggering the interaction, defining the set of modalities, in particular the second sensor(s) 18, participating in the interaction, and determining CARE properties characterizing the relations between said modalities. The CARE properties include the following properties: complementarity, assignment, redundancy and equivalence. Complementarity corresponds to the case where two modalities contribute complementary information useful to the considered interaction. Assignment corresponds to the case where the interaction is done with a single modality. Redundancy corresponds to the case where two modalities contribute a same type of information, this redundancy being useful for example to secure an interaction. Equivalence corresponds to the case where a same interaction can be done by several different types of modalities, independently.

The definition of the modality tree next for example comprises creating nodes and links, with identical triggering events being grouped together in a same node, with the creation of a link between a node corresponding to a triggering event and a node corresponding to a modality associated with said triggering event. As an optional addition, each interaction is inserted in the form of a subtree into the overall modality tree.

The definition of the modality tree next for example comprises defining selection and validation laws for the final action associated with the interaction, said selection and validation laws allowing the electronic interface device 20, in particular the activation module 32, to determine the second sensor(s) 18 to be activated, in particular in case of conflict on a first signal, i.e., a triggering event, shared by two interactions and/or making it possible to validate the acquired second signal, i.e., the data from the modality, if there is no conflict relative to the triggering event. These selection and validation laws also allow the activation module 32 to determine when several second sensors 18 need to be activated, following the detection of a first signal requiring the subsequent activation of several second sensors 18. Examples of simultaneous activation of several second sensors 18 will be described hereinafter.

The acquisition module 34 is configured to acquire the second signal, received by each second sensor previously activated by the activation module 32. The acquisition module 34 is for example configured to listen to each activated second sensor 18 from the activation moment, the acquisition of the second signal then being done as they go. Alternatively, the acquisition module 34 is configured to acquire the second signal at the end of its complete reception by the considered second sensor 18, the second sensor 18 then storing the received second signal as it is received, and sending it to the acquisition module 34 only when the reception of the second signal is complete.

The generating module 36 is configured to generate a message corresponding to the second acquired signal, then to send it to the corresponding avionic system(s) 14.

As an optional addition, the generating module 36 is further configured to verify the coherence of each acquired second signal based on predefined verification rules, and, in case of incoherence of the acquired second signal relative to the predefined verification rules, to ignore said acquired second signal. The predefined verification rules are for example included in the modality tree, as previously described, in particular in the validation laws.

Also as an optional addition, the generating module 36 is further configured, when several second sensors 18 are activated by the activation module 32, to select a second signal from among the second signals acquired based on predefined selection rules, and to then generate the message corresponding to the selected second signal. The predefined selection rules are for example included in the modality tree, as previously described, in particular in the selection laws.

One skilled in the art will note that, when several second sensors 18 are activated by the activation module 32, two alternatives are possible for generating the message.

According to a first alternative, all of the second signals acquired from the activated second sensors 18 are necessary to generate the message, and the generating module 36 then does not select a particular second signal from among the acquired second signals.

According to a second alternative, only a portion of the acquired second signals, such as only one second signal in particular, from among the acquired second signals, is necessary to generate the message, and the generating module 36 then selects said portion of the second signals from among the set of acquired second signals. As an example of the second alternative, if two voice recognition engines are activated by the activation module 32 with a respective grammar for each voice recognition engine, the two grammars being different, the generating module 36 is then configured to evaluate the two second signals acquired by the two voice recognition engines, to then select the acquired second signal having the best confidence level.

As another optional addition, the generating module 36 is further configured to apply processing to the second signal based on configuration data of the cockpit of the aircraft 12, and to generate a message corresponding to said processed second signal. Said processing is called postprocessing, or subsequent processing, in that it corresponds to the last processing done before generating the message.

One skilled in the art will then understand that this postprocessing seeks to next reduce the actions or processing to be done by the avionic system(s) 14 receiving the message. As an example, the postprocessing is a change of coordinate system to indicate which screen the user 26 is looking at, which then makes it possible to make the data received within the message more intelligible for the receiving avionic system 14. This postprocessing is for example based at least in part on the configuration database of the cockpit.

One skilled in the art will understand that this postprocessing then forms an interpretation of the second signal received by the interface device 20 in the message sent to the avionic system 14 in question, hence the name interpreter also given to the electronic interface device 20 according to the invention.

As an optional addition, the second activation module 38 is configured to activate at least one external processing device 24 and to send the second acquired signal to said external processing device 24, so that the processing device 24 performs the associated processing on said second signal.

According to this optional addition, the external processing device 24 activated by the second activation module 38 is for example a voice recognition device, the applied processing then being a voice recognition algorithm, in order to convert the second acquired signal, in the case at hand a voice signal, into text corresponding to the transcription of said voice signal. Alternatively, the external processing device 24 activated by the second activation module 38 is a gesture recognition device, then configured to apply a gesture recognition algorithm to the second acquired signal in order to identify the detected gesture. The detected gesture signal is for example a set of successive images, and the gesture recognition algorithm is then an image processing algorithm applied to the series of acquired images, in order to identify the gesture in question in the acquired images, such as a raising of finger(s) of the user 26, or a specific movement, such as the sweeping of a limb of the user 26. Additionally, the gesture recognition algorithm is also able to determine the positions in three dimensions, for example in the coordinate system of the gesture sensor, of one or several characteristic nodes of a model of the user 26, these nodes of the model typically corresponding to joints of the user 26, or extremities of the user 26, such as fingertips. Also additionally, the gesture recognition algorithm is also able to determine the key direction vectors, such as the direction of the users fingers, or the limbs of the user 26, such as one or several of his forearms.

According to this optional addition, the second acquisition module 40 is then configured to acquire the second processed signal from the external processing device 24, this acquisition for example consisting of receiving the second processed signal from said processing device 24, the processing device 24 being suitable for sending automatically, at the end of said treatment, the processed signal to the electronic interface device 20, in particular to its second acquisition module 40.

According to this optional addition, the generating module 36 is then configured to generate a message corresponding to the second processed signal. One skilled in the art will further understand that when the generating module 36 is configured to apply postprocessing to the second signal, based on configuration data for the cockpit of the aircraft 12, then the postprocessing is applied to the second processed signal acquired by the second acquisition module 40.

Also as an optional addition, the recording module 42 is configured to record, i.e., store, at least one acquired second signal, the recording for example being done in the memory 46. The recording module 42 is preferably configured to record an acquired second signal only in case of delay by the external processing device 24 in the processing of the second signals, this recording then seeking to avoid a data loss, and to guarantee that each acquired second signal will indeed be taken into account and processed over the course of the availability of the external processing device 24. The recording module 42 is then configured to record a current acquired second signal only in case of activation of the processing device 24 by the second activation module 38 for a preceding acquired second signal and when there is no return by the processing device 24 for this preceding acquired second signal, i.e., when there is no acquisition, by the second acquisition module 40, of the processed preceding second signal, coming from the external processing device 24.

Figure 2:
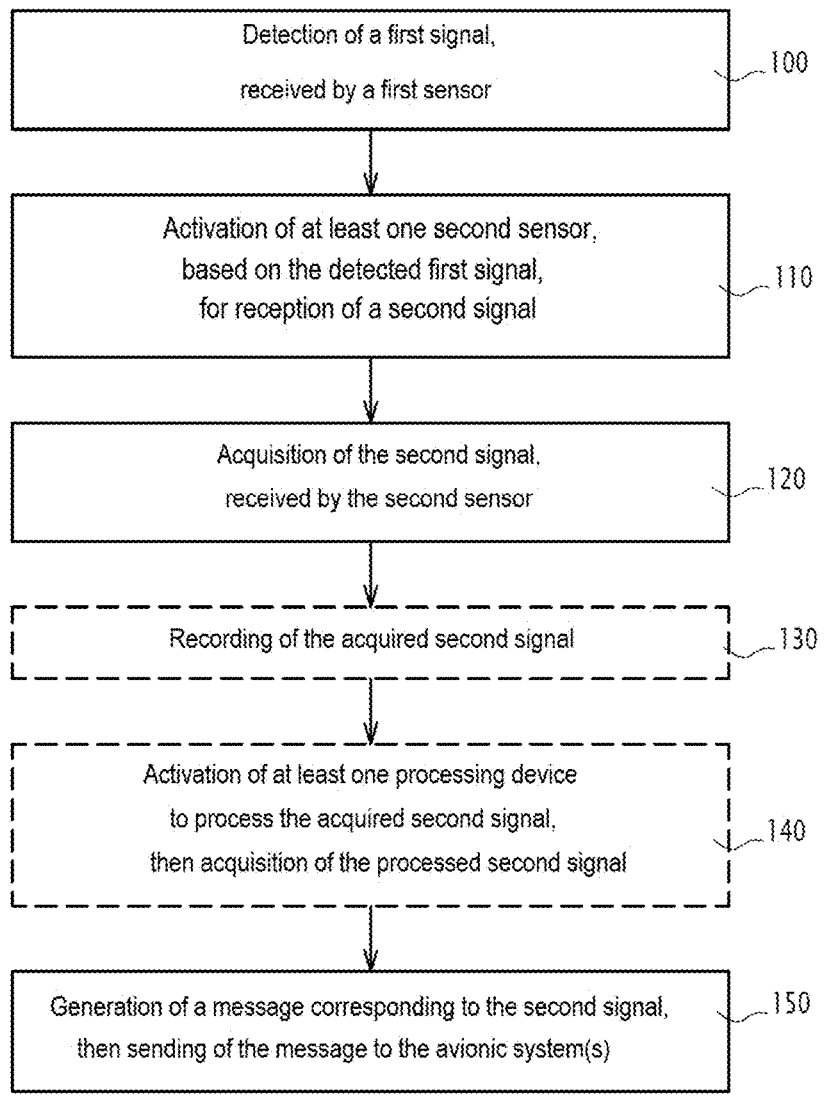
FIG. 2 is a flowchart of a method according to the invention, for communication between at least one avionic system and the sensor, the method being carried out by the electronic interface device of FIG. 1.

The operation of the electronic interface device 20 will now be explained using FIG. 2, showing a flowchart of the method, according to the invention, for communication between the set 16 of sensors 18 and the avionic system(s) 14, the method being carried out by the electronic interface device 20.

This communication method will first be described in general, and different usage cases will be described next as more detailed examples.

During an initial step 100, the electronic interface device 20 detects, via its detection module 30, a first signal, received by a first sensor 18 of the set 16. As previously indicated, this first signal constitutes a triggering event for a new interaction between the set 16 of sensors, on the one hand, and the avionic system(s) 14, on the other hand, this interaction being managed by the electronic interface device 20, which, as its name indicates, then serves as the interface between the set 16 of sensors and the avionic system(s) 14.

The interface device 20 activates, during step 110 and via its activation module 32, at least one second sensor 18 of the set 16, this activation being done based on the detected first signal and predefined determining rules. This activation of the second sensor(s) 18 then triggers the reception of a second signal by each corresponding second sensor 18.

The interface device 20 acquires, during step 120 and via its acquisition module 34, the second signal that was received by the second sensor 18 previously activated during step 110.

During the optional following step 130, the interface device 20 records, if necessary and via its recording module 42, the acquired second signal, in order to avoid a loss of information, in the case where the acquisition of the second signals is done more quickly than the processing thereof done later by the external processing device 24. Indeed, the recording module 42 preferably performs this recording only when it detects that a new second signal has been acquired, while the previously acquired second signal has not yet been processed by the external processing device 24, i.e., the external processing device 24 has been activated by the second activation module 38, but the second acquisition module 40 has not yet received the corresponding processed second signal in return, from the external processing device 24.

During the following step 140, which is also optional, the interface device 20 activates, via its second activation module 38, a corresponding external processing device 24 and sends it the acquired second signal for processing, then the interface device 20 acquires, via its second acquisition module 40, the processed second signal, once said processing is done by the external processing device 24.

The interface device 20 lastly performs, during step 150 and via its generating module 36, the generation of a message corresponding to the second signal, then the sending of said message to the corresponding avionic system(s) 14. This generation of the message is done, if applicable, from the second processed signal.

As an optional addition, during this step 150, the generating module 36 further applies postprocessing to the second signal, based on configuration data from the cockpit of the aircraft 12, and the generated message then corresponds to the second signal from said postprocessing.

During step 150, the generating module 36 then makes the generated message available to the avionic system(s) 14, this generated message for example corresponding to raw data from the modalities, said data being specific to the language related to the modality. As an example, the data made available to the avionic system(s) 14 are technical data or properties, such as frequencies, speeds, headings, altitudes, or waypoints.

Alternatively or additionally, the message provided to the avionic system(s) 14 corresponds to a reified datum, the interface device 20 then helping, via its generating module 36, the corresponding avionic system 14 to integrate the raw information from the modalities by performing the postprocessing, or subsequent processing, as previously described. As an example of reification, the generating module 36 performs typing of received alphanumeric data, from several key words recognized in a received data message and from specific words of a grammar. For example, the generating module 36 recognizes that in a data message such as "descend 100" or "descend flight level 100", the value 100 corresponds to an altitude, and then sends this altitude information to the corresponding avionic system 14. As an additional example, the postprocessing done by the generating module 36 is a change of coordinate system, for example to go from the coordinates of a local coordinate system associated with one of the sensors 18 to a known coordinate system of the avionic system 14.

Also alternatively or additionally, the message generated, then sent to the avionic system 14 is a command of the avionic system 14. If applicable, the avionic system 14 is able to directly execute the command received from the interface device 20, or to submit it to the user 26, such as the pilot of the aircraft 12, for validation, before executing it. This choice between these two possible alternatives, i.e., executing the received command directly, or having it validated by the pilot of the aircraft first, depends on the criticality of the received command.

As an example, the command able to be generated, then sent by the interface device 20 is a change of frequency, a change of speed, a change of heading, a change of altitude, a reconfiguration of the display in the cockpit of the aircraft 12, for example with changes of format, man/machine interface configuration or an overall reconfiguration of the cockpit, a change of values of the system, such as a temperature, or an air conditioning parameter, inside the aircraft 12, an enlargement or on the contrary a zoom out on a displayed map, or the sending of a message on a data link.

Several examples of multimodal interactions will now be described to illustrate a few usage cases of the interface device 20 according to the invention.

A first usage case corresponds to a Touch and Talk, for which the first signal, or triggering event, is pressure by the user 26 on a specific zone of a touch-sensitive surface of a man/machine interface, followed by the pronouncement by the user 26 of a voice command dedicated to that zone. According to this first usage case, the first sensor is then a touch-sensitive sensor integrated into the touch-sensitive surface, and the second sensor, activated by the interface device 20 after the detection of this tactile tap corresponding to the first signal, is a voice recognition engine capable of detecting the voice command by the user 26, then applying a voice recognition algorithm to it in order to transcribe it into a chain of characters. According to this first usage case, the interface device 20 is further capable of verifying that the data from the voice recognition engine has the proper syntax and proper semantics based on a current operating context. For example, if the pilot of the aircraft 12 asks to enter a radio frequency, the data will then have a radio frequency-type format in a specific frequency band, and the interface device 20 will then verify that the chain of characters resulting from the voice recognition engine indeed corresponds to a radio frequency coherent with the current position of the aircraft 12.

A second usage case is a Look and Talk, for which the first signal, or triggering event, is for example pressure on a physical button dedicated to voice recognition, or the pronouncement of a particular voice command, such as a keyword dedicated to triggering voice recognition. After this first signal is detected, the interface device 20 then activates an eye tracking sensor as second sensor, in order to acquire a visual signal from the user 26, such as a look toward a particular zone on a viewing screen of a man/machine interface, and a voice recognition engine as second additional sensor, to acquire a voice command pronounced by the user 26 relative to the zone toward which he is looking. One skilled in the art will then understand that this second usage case is an example of simultaneous activation of second sensors 18.

One skilled in the art will further observe that when the user 26 presses the physical button dedicated to voice recognition, the interface device 20 detects a potential conflict with another usage case that will be described later, namely the fifth usage case corresponding to pressing followed by a voice command (Push and Talk). The interface device 20 will therefore first check whether the zone observed by the user 26 corresponds to a zone eligible for the voice command, and if applicable will activate the voice recognition engine to capture a voice command dedicated to said zone. The interface device 20 will, in parallel, activate the voice recognition engine to capture an overall voice command corresponding to the fifth usage case. The interface device 20 will then recover the data from these two activations of the voice recognition engine, and will next check the confidence level that the voice recognition engine assigns to each of the two results obtained for these two voice recognition activations. The interface device 20 will then generate a message corresponding to the voice recognition results having the highest confidence level, or the highest likelihood.

One skilled in the art will also observe that if the first signal, or triggering event, of the second usage case is a voice command with a specific keyword, then the interface device 20 will also detect a potential conflict with another usage case, namely the fourth usage case corresponding to a call followed by a voice command (Call and Talk). In this case, the interface device 20 will proceed similarly to what was indicated above, namely by activating both the voice recognition engine for the zone observed by the pilot, and the voice recognition engine for overall voice recognition, and will generate the message based on the likeliest result from the voice recognition engine.

A third usage case corresponds to eye tracking of the user 26 followed by a movement (Look and Move), for which the first signal, or triggering event, is either pressure on a physical button dedicated to gesture recognition, or the pronouncement of a particular voice command corresponding to a particular keyword, or a particular gesture signal. According to this third usage case, the interface device 20 then activates, after having detected the aforementioned triggering event, an eye tracking sensor as second sensor to acquire a gaze of the user 26 toward a particular zone, such as a zone on a display screen of the man/machine interface, and a movement sensor as second additional sensor in order to acquire a gesture command from the user 26 related to the zone toward which he is looking. One skilled in the art will then understand that this third usage case is another example of simultaneous activation of second sensors 18.

A fourth usage case corresponds to a call followed by a voice command (Call and Talk), for which the first signal, or triggering event, is a voice command with a particular keyword in order to call on electronic assistant. The interface device 20 then activates, after detecting this triggering event, a voice recognition engine in order to acquire the voice command that was next pronounced by the user 26, to transcribe a chain of characters therefrom making it possible to generate the message for the avionic system(s) 14. One skilled in the art will note that this usage case avoids going through a physical switch, such as a physical button or tactile tap.

The fifth usage case corresponds, as previously indicated, to pressure followed by a voice command (Push and Talk), for which the first signal is pressure by the user 26 on the physical button dedicated to voice recognition, the second signal next being the pronouncement of a voice command by the user 26. According to this fifth usage case, the interface device 20 then activates, after detecting this pressure on the physical button, the voice recognition engine in order to acquire the voice command pronounced by the user 26, then to transcribe it into a chain of characters, next used by the generating engine 36 to generate the message and send it to the avionic system(s) 14.

A sixth usage case corresponds to a notepad mode from a voice message from the user 26 (Speech Pad), for which the first signal is pressure on a physical button, such as a PTT (Push To Talk) button, and the interface device then active after the detection of this pressure on the PTT button, the voice recognition engine as second sensor, in order to detect the voice message from the user 26 following this pressure on the PTT button. The interface device 20 will then receive the text transcription of the voice message pronounced by the user and seek to type the data thus transcribed to send action instructions to the avionic system(s) 14 in order to assist the user 26, such as the pilot, based on the content of his voice message. For example, if the user 26 pronounces the following voice message "heading 260°, climb to flight level 100", then the interface device 20 will interpret the number 260 as a request to change heading to 260°, and the number 100 as a request to change altitude by climbing to a flight level 100. The PTT button is a button present in the cockpit of the aircraft that allows the user 26, in particular the pilot, to communicate with air traffic control (ATC), then to speak with air control.

One can thus see that the electronic interface device 20 according to the invention offers a better interaction with the user 26 or the electronic equipment 28 to next communicate with the avionic system(s) 14, by making it possible to take different signals from the user 26 or the electronic equipment 28 into account. The interface device 20 then forms a coordinator between the elements between which it is interconnected, namely the set 16 of sensors on the one hand, and the avionic system(s) 14 on the other hand. Additionally, the interface device 20 also forms an interpreter and then facilitates the use, by the avionic system(s) 14, of the message that is delivered to them as output.

The invention claimed is:

1. An electronic interface device between at least one avionic system and a set of sensors, each avionic system and each sensor being capable of being connected to an electronic interface device, the electronic interface device being intended to be on board an aircraft and comprising:
    a detection module configured to detect a first signal, the first signal being able to be sent by a user or a piece of electronic equipment and received by a first sensor from the set of sensors;
    an activation module configured to activate at least one second sensor from the set of sensors as a function of the first detected signal and predefined determination rules, only the or each second sensor thus activated being able to detect a second signal from the user or the piece of electronic equipment;
    a second activation module configured to activate at least one device for processing the second acquired signal, the processing device being outside the interface device, only the or each thus activated processing device being able to process the second signal;
    an acquisition module configured to acquire the second signal, received by each second sensor;
    a second acquisition module configured to acquire the second signal processed by the processing device; and
    a generating module configured to generate a message corresponding to the second acquired signal and to send the message to one or several corresponding avionic systems.

2. The device according to claim 1, wherein the electronic interface device further comprises a recording module configured to record at least one second acquired signal.

3. The device according to claim 2, wherein the recording module is configured to record at least one current second acquired signal in case of absence of acquisition, by the second acquisition module, of a preceding second signal processed after the activation, by the second activation module, of a processing device for processing a preceding acquired second signal.

4. The device according to claim 1, wherein the generating module is further configured to verify the coherence of each acquired second signal based on predefined verification rules, and in case of incoherence, to ignore said acquired second signal.

5. The device according to claim 1, wherein the generating module is further configured to apply processing to the second signal based on configuration data of the cockpit of the aircraft, and to generate a message corresponding to the processed second signal.

6. The device according to claim 1, wherein when several second sensors are activated by the activation module, the generating module is further configured to select a second signal from among the second signals acquired based on predefined selection rules, and to generate the message corresponding to the selected second signal.

7. The device according to claim 1, wherein each second sensor activated by the activation module is of a different type from that of the first sensor.

8. The device according to claim 1, wherein each sensor from the set of sensors being of the type chosen from among the group consisting of: a touch-sensitive sensor, a mechanical sensor, a sound sensor, an image sensor, a movement sensor, an eye tracking sensor, a physiological senor and a data receiver.

9. An avionic installation intended to be on board an aircraft, the avionic installation comprising at least one avionic system, a set of sensors and an electronic interface device connected between each avionic system and the set of sensors, wherein the electronic interface device is according to claim 1.

10. The avionic installation according to claim 9, wherein the avionic installation further comprises at least one secure gateway, and the electronic interface device is connected to each avionic system via a corresponding secure gateway.

11. A communication method between at least one avionic system and a set of sensors, the method being carried out by such an electronic interface device able to be connected to each avionic system, and the sensors and to be on board an aircraft, the method comprising:
   detecting a first signal, the first signal being able to be sent by a user of a piece of electronic equipment and received by a first sensor from the set of sensors;
   activating at least one second sensor from the set of sensors, to receive a second signal from the set of sensors as a function of the first detected signal and predefined determination rules, only the or each of the at least one second sensor thus activated being able to detect a second signal from the user or the piece of electronic equipment;
   acquiring the second signal, received by each second sensor; and
   activating at least one device for processing the second acquired signal, the processing device being outside the interface device, only the or each thus activated processing device being able to process the second signal;
   acquiring the second signal by the processing device; and
   generating a message corresponding to the second acquired signal, and sending said message to one or several corresponding avionic systems.

12. A non-transitory computer readable medium including a computer program comprising software instructions which, when executed by a computer, carry out a method according to claim 11.

* * * * *